United States Patent
Kariv (10) Patent No.: US 7,962,490 B1
(45) Date of Patent: Jun. 14, 2011

(54) SYSTEM, METHOD, AND COMPUTER PROGRAM PRODUCT FOR ANALYZING AND DECOMPOSING A PLURALITY OF RULES INTO A PLURALITY OF CONTEXTS

(75) Inventor: Adi Kariv, Givatayyim (IL)

(73) Assignee: Amdocs Software Systems Limited, Dublin (IE)

( * ) Notice: Subject to any disclaimer, the term of this patent is extended or adjusted under 35 U.S.C. 154(b) by 556 days.

(21) Appl. No.: 11/970,438

(22) Filed: Jan. 7, 2008

(51) Int. Cl.
*G06E 17/031* (2006.01)

(52) U.S. Cl. ........ 707/749; 707/748; 707/737; 707/756; 707/755

(58) Field of Classification Search .................. 707/708, 707/737, 748
See application file for complete search history.

(56) References Cited

U.S. PATENT DOCUMENTS

| | | | |
|---|---|---|---|
| 7,412,431 B2 * | 8/2008 | Corl et al. ........................ | 706/47 |
| 2001/0037324 A1 * | 11/2001 | Agrawal et al. .................... | 707/1 |
| 2003/0212657 A1 * | 11/2003 | Kaluskar et al. .................. | 707/1 |
| 2004/0098389 A1 * | 5/2004 | Jones et al. ........................ | 707/6 |
| 2005/0125290 A1 * | 6/2005 | Beyda et al. ...................... | 705/14 |
| 2005/0177586 A1 * | 8/2005 | Chen et al. ...................... | 707/100 |
| 2005/0216267 A1 * | 9/2005 | Kustner et al. ................. | 704/260 |
| 2006/0047691 A1 * | 3/2006 | Humphreys et al. .......... | 707/102 |
| 2009/0327243 A1 * | 12/2009 | Pradhan et al. .................. | 707/3 |

FOREIGN PATENT DOCUMENTS

WO  WO 2006/021944  3/2006

OTHER PUBLICATIONS

Mahgoub et al., "A Text Mining Technique Using Association Rules Extraction", Jun. 12, 2006, International Journal of Computational Intelligence.*
Kuo et al., "Human Selection of Mnemonic Phrase-based Passwords", Jul. 2006, Symposium on Usable Privacy and Security.*
Carlson et al., "Text Classification Rule Induction in the Presence of Domain-Specific Expression Forms", Jul. 2005, International Workshop on Mixed Language Explanations in Learning Environments.*
Ryu et al., "A Task Decomposition Scheme for Context Aggregation in Personal Smart Space", 2007, International Federation for Information Processiong.*

* cited by examiner

*Primary Examiner* — Charles Kim
*Assistant Examiner* — Sheryl Holland
(74) *Attorney, Agent, or Firm* — Zilka-Kotab, PC (57) ABSTRACT

A system, method, and computer program product are provided for analyzing a plurality of rules in a textual rules structure. Further, the plurality of rules are decomposed into a plurality of contexts, based on the analysis. In addition, the plurality of contexts are stored in a table. Furthermore, a database associated with a device and/or any robot equipped with an operating system may be utilized.

18 Claims, 8 Drawing Sheets

SYSTEM, METHOD, AND COMPUTER PROGRAM PRODUCT FOR ANALYZING AND DECOMPOSING A PLURALITY OF RULES INTO A PLURALITY OF CONTEXTS

RELATED APPLICATIONS

The present application is related to PCT application No. PCT/IL2004/000741 granted Mar. 2, 2006, which is incorporated by reference in its entirety for all purposes.

FIELD OF THE INVENTION

The present invention relates to database systems, and more particularly to efficiently processing complex data sets in database systems.

BACKGROUND

Modern business systems and complex event processing systems require fast and efficient qualification of incoming data streams. For example, telephone record processing, fraud detection, stock alerts, and computer security are examples of such systems.

Traditionally, these systems implement processes that validate a large number of rules, a collection of rules on raw data attributes, and filters associated with data derived from the data arrival time.

The complexity of the system increases as the number of rules increases, which slows the processing of filtering. Further, as the complexity of the rules increase, the processing of the rules slows.

There is thus a need for overcoming these and/or other issues associated with the prior art.

SUMMARY

A system, method, and computer program product are provided for analyzing a plurality of rules in a textual rules structure. Further, the plurality of rules are decomposed into a plurality of contexts, based on the analysis. In addition, the plurality of contexts are stored in a table. Additionally, different permutations of names associated with the plurality of contexts may be located. Still yet, cabinets associated with the different permutations of names associated with the plurality of contexts may be located. Furthermore, a database associated with a device and/or any robot equipped with an operating system may be utilized.

DETAILED DESCRIPTION

Figure 1:
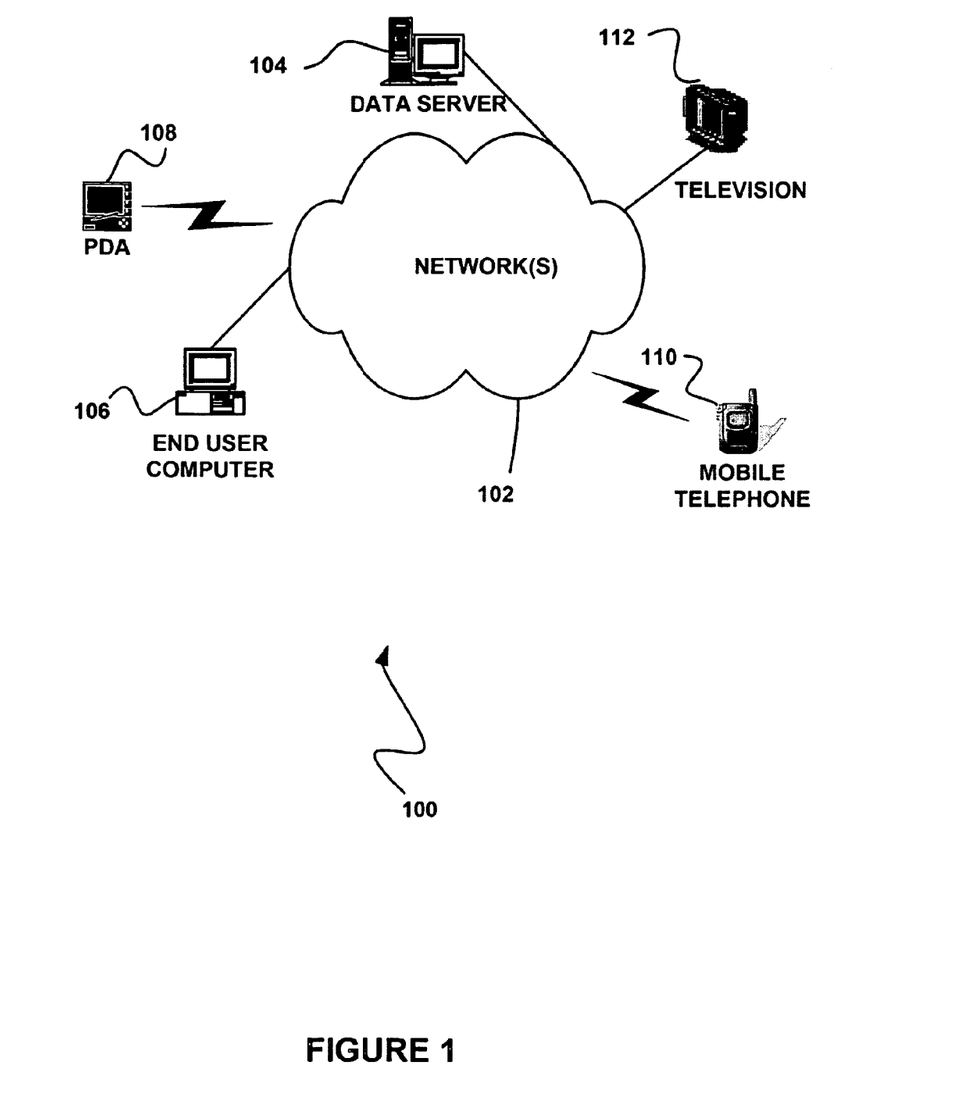
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc. Furthermore, in one embodiment, a database may be associated with the server computer 104, the end user computer 106, a device of the plurality of devices, and/or a robot equipped with an operating system.

Figure 2:
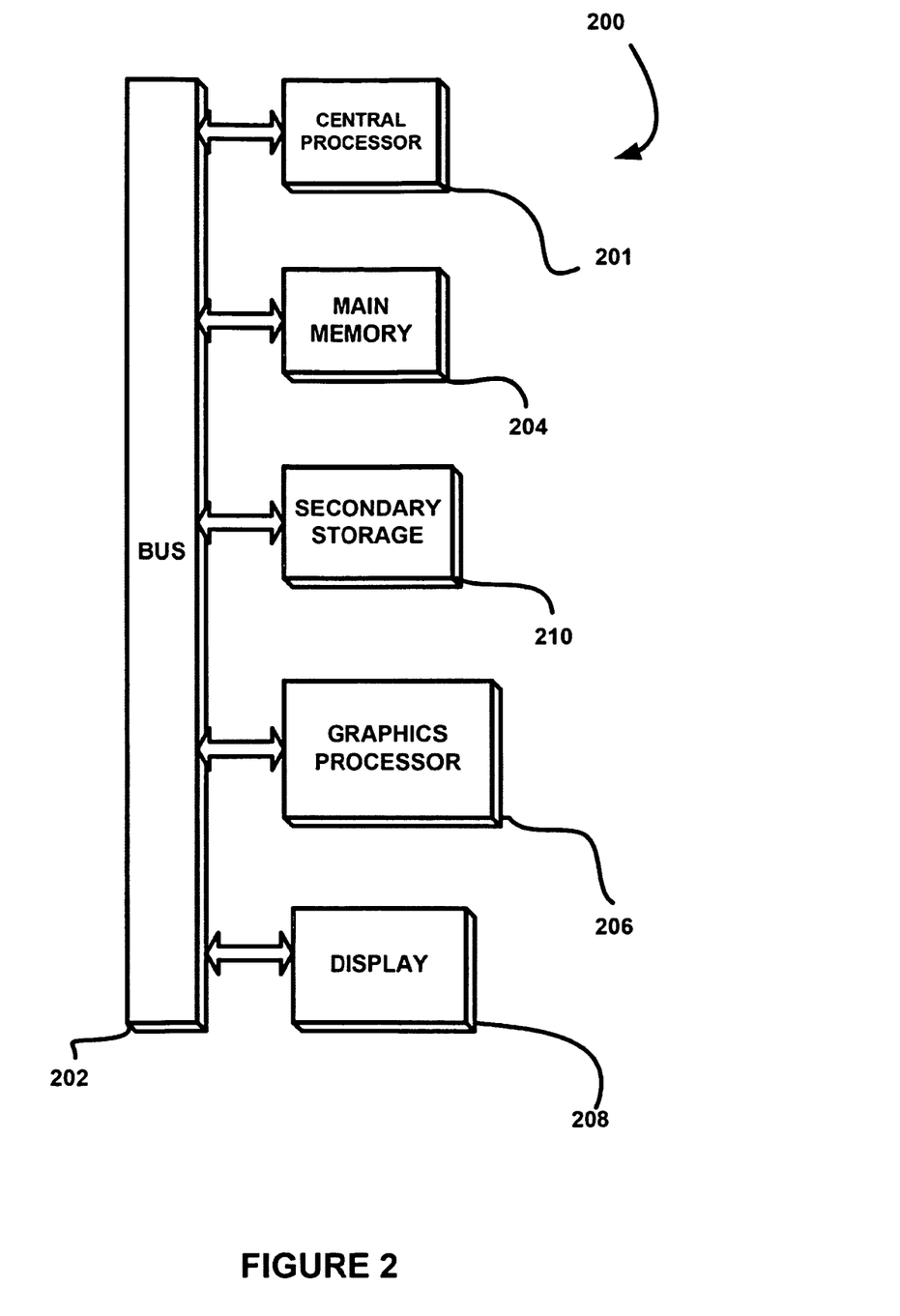
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Figure 3A:
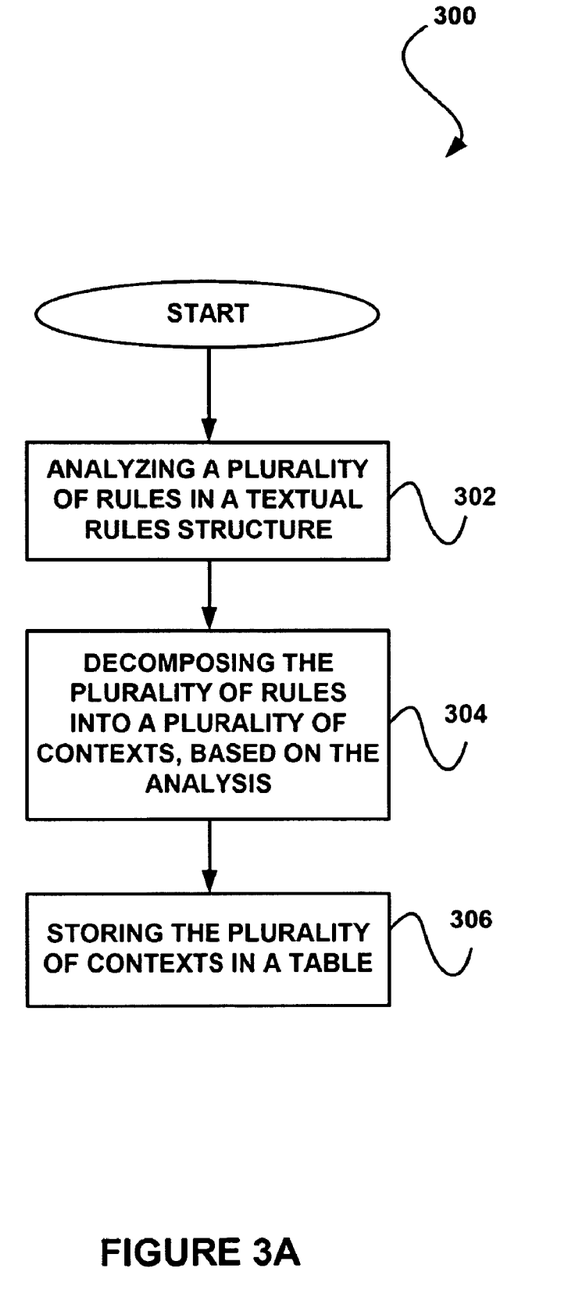
FIG. 3A illustrates a method for analyzing and decomposing a plurality of rules into a plurality of contexts, in accordance with one embodiment.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media FIG. 3A illustrates a method 300 for analyzing and decomposing a plurality of rules into a plurality of contexts, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, a plurality of rules in a textual rules structure are analyzed. In the context of the present description, the plurality of rules may include operands, operators, values, variables, etc. As an option, the operators may include logical operators such as or, and, not, equals, like, in, greater than, less than, or any other logical operator.

Still yet, in one embodiment, the rules may be nested and/or grouped using any combination of the logical operators.

Further, in another embodiment, the textual rules structure may include a rules file, a text file, another database, a data feed, or any other data structure capable of storing the textual rules structure. Furthermore, as an option, the rules file may include an application specific file, an ASCII file, a binary file, an XML file, a CSV file, a database file, or any other file format capable of including a textual rules structure. Optionally, the rules file may be analyzed by an interpreting module. Still yet, in yet another embodiment, the analyzing may include reading the textual rules structure, determining the format of the textual rules structure, examining the textual rules structure, etc.

Additionally, as shown in operation 304, the plurality of rules are decomposed into a plurality of contexts, based on the analysis. In the context of the present description, the decomposition may include separating, dividing, tokenizing, etc. each rule in the plurality of rules into the plurality of contexts. In another embodiment, each context in the plurality of contexts may be associated with a number of distinct appearances of data in the data stream, a table, a file, or any other structure capable of including data. For example, a context may include a flag such as condition or state, or attributes such as a source address, a source port, a source type, a destination address, a destination port, a destination type, a protocol, a service, a reason, a product, message information, an originating number, a destination number, a time, a date, a timestamp, a duration, a session record, and an attack, a signature, etc. Optionally, each context in the plurality of contexts may be utilized to filter at least one value.

In one embodiment, the context may be identified as a heavy context or a light context. As yet another option, the light context may have a fewer number of distinct occurrences than a number of distinct occurrences included in the heavy contexts. For example, the light context may have a few distinct occurrences of the data in the data stream, and the heavy context may have numerous distinct occurrences of the data in the data stream. Optionally, the context may be identified as the heavy context or the light context based on a predetermined number of distinct occurrences of the data. For example, the context with 50 or less occurrences in the data stream may be identified as the light context, and the context with more than 50 occurrences in the data stream may be identified as the heavy context. Of course, the predetermined number of distinct occurrences may include any number of distinct occurrences that has been predetermined.

Further, in yet another embodiment, the analysis of the textual rules structure may determine how to decompose the plurality of rules into the plurality of contexts. As an option, the decomposition may be performed based on the logical operators. For example, each rule may be decomposed based on the use of a logical OR operator or any other operator capable of separating the rules into the plurality of contexts. In yet another embodiment, it may be determined if each context of the plurality of contexts is unique. For example, for each rule in the plurality of rules, each context may be determined to be unique if the context does not match the other plurality of contexts associated with each rule in the plurality of rules. As an option, if it is determined that the context is non-unique, the non-unique context may be removed.

Furthermore, as shown in operation 306, the plurality of contexts are stored in a table. In the context of the present description, the table may include a physical table in a database, a logical table in a database, a file, a spreadsheet, or any data structure capable of storing data. Furthermore, as an option, the table may include a cabinet, a header, a body, and/or any field capable of storing data. Optionally, the data may include metadata. Still yet, as another option, the table may include a dynamic table, a temporary table, a persistent table, a permanent table, etc. In one embodiment, the plurality of tokens may be stored in the header and/or body of at least one record in the table.

Still yet, in another embodiment, the table may be processed to determine a plurality of contexts. Still yet, in another embodiment, if each context in the plurality of contexts filters a plurality of values, then the plurality of values may be serialized into a single value for the each context. As an option, serializing may include separating the plurality of values into a series of single values associated with each context. In still yet another embodiment, the context may include plurality of contexts associated with each rule in the plurality of rules. As an option, the context may include a concatenation of the plurality of contexts associated with each rule. For example, the concatenation may include the unique contexts associated with one rule of the plurality of rules. Furthermore, as yet another option, the concatenation may include one value associated with one context of the plurality of contexts joined with at leave one other value associated with one other context of the plurality of contexts.

In one embodiment, for each rule in the plurality of rules, each combination of the values for each context in the plurality of contexts may be added into another table. As an option, the table may include a plurality of light contexts, a plurality of heavy contexts, or a plurality of heavy contexts with a plurality of light contexts. Optionally, the another table may also include looping contexts, and/or not looping contexts. For example, a looping context may include a positive context, and a not looping context may include a negative context. As an option, the combination of contexts may be added into a field of the another table. Optionally, the field may include a header field. Still yet, as another embodiment, the value of the field may include a concatenation of the values of each combination of contexts for each rule. Optionally, the concatenation of values may be hashed. For example, the hashing may include a numeric hash, an alphanumeric hash, a hexadecimal hash, a binary hash, etc. As an option, the hash may be generated by a message-digest algorithm 5 (MD5) algorithm, a cyclic redundancy check (CRC) algorithm, secure hash algorithm (SHA) algorithm, or any other method of generating a hashed value.

Figure 3B:
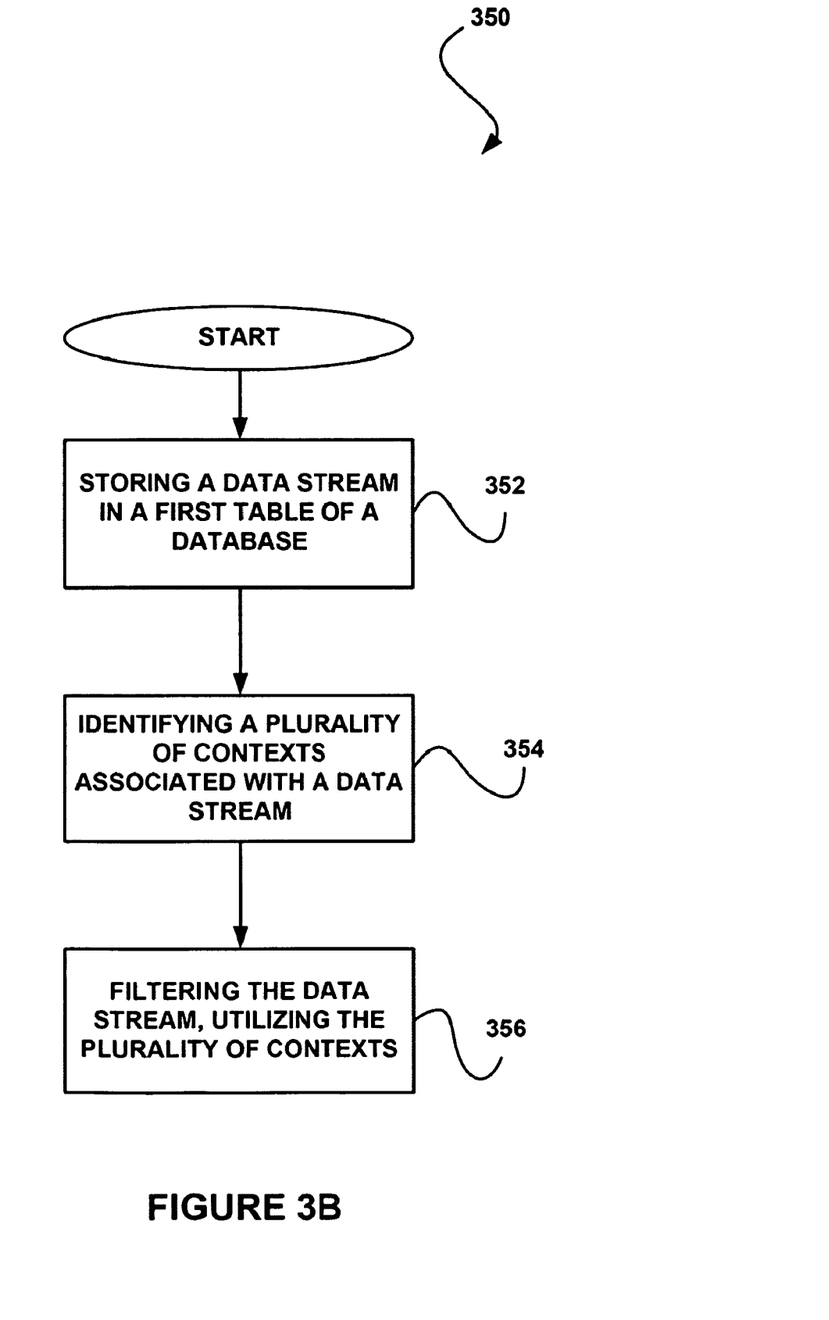
FIG. 3B illustrates a method for a reduced stream filter, in accordance with another embodiment.

FIG. 3B illustrates a method 350 for a reduced stream filter, in accordance with another embodiment. As an option, the method 350 may be implemented in the context of the details of FIGS. 1-2 and/or 3A. Of course, however, the method 350 may be carried out in any desired environment. Further, the aforementioned definitions may equally apply to the description below.

As shown in operation 352, a data stream is stored in a first table of a database. In the context of the present description, the data stream may include a plurality of data, records, events, alerts, packets, pipes, or any other method of streaming data. Optionally, the data stream may be received from an application. Further, as another option, the data stream may be received via an application programming interface (API), a data socket, a network socket, a network stack, a network connection, or any other method of receiving data. In another embodiment, storing may include inserting, updating, adding, saving, etc. the data stream in the first table. Optionally, data associated with the data stream may be stored in the first table as a plurality of records. Further, in another embodiment, the first table of the database may include a data processing table. As another option, the data processing table may be associated with a single data stream.

In one embodiment, a subset of the contexts may be separated from the data stream. Optionally, the separating of the subset of the contexts may include refining, filtering, cleaning, consolidating, etc. the data in the first table of the database. As an option, the refining may include hashing a portion of data in the first table. In another embodiment, the separating of the subset of the contexts may include refining, moving, copying, filtering, consolidating, etc. data in the first table into a second table.

As shown in operation 354, a plurality of contexts associated with a data stream are identified. As an option, the subset of the contexts may include at least one context associated with the data stream. Furthermore, in another embodiment, contexts associated with the data stream may be identified by processing, parsing, filtering, verifying, etc. the data stream. In yet another embodiment, a plurality of light contexts, a plurality of heavy contexts, a plurality of heavy contexts with a plurality of light contexts, and/or a plurality of looping and not looping contexts may be identified.

In yet another embodiment, based on the plurality of contexts identified, a field associated with at least one other table may be updated. As an option, the field may include a header field associated with the at least one other table. Optionally, the header field may be utilized to prevent the joining of a plurality of records of the at least one other table with a plurality of records of the data stream. For example, updating a header field associated with the at least one other table may prevent the joining of the plurality of records of the at least one other table with the plurality of records of the data stream. In yet another embodiment, the header field may include a linker field. Optionally, the linker field may include any field in the table that may link at least one record, data, and/or table to at least one other record, data, and/or table, etc. Furthermore, as yet another embodiment, the joining of the plurality of records of the data stream with the plurality of records of the at least one other table may utilize the linker field.

As shown in operation 356, the data stream is filtered, utilizing the plurality of contexts. In the context of the present description, the plurality of contexts identified may be utilized for filtering the data stream. Further, in one option, at least one value associated with the plurality of contexts identified may be utilized for filtering the data stream. As an option, the plurality of contexts may be utilized to identify at least one other table associated with one context of the plurality of contexts. For example, the one context may be associated with the at least one other table. Optionally, if the header field associated with the at least one other table is updated to prevent the joining, then the at least one other table may not be utilized for filtering.

In one embodiment, the filtering may further include joining the plurality of records of the first table and the plurality of records of the at least one other table. In another embodiment, the joining may include matching a plurality of records. In yet another embodiment, the joining may utilize the linker field. As an option, the joining may move matching records from the first table and/or the at least one other table to a third table. In still yet another embodiment, a fourth table may be joined with the third table. Optionally, the plurality of matching records for the third table and the fourth table may be moved from the third table to the fourth table.

In one embodiment, the filtering may include at least two filtering processes. As an option, the at least two filtering processes may execute in parallel. As an option, the execution of the at least two filtering processes in parallel may be performed utilizing multitasking, multiprocessing, symmetric multiprocessing (SMP), parallel processing, etc. by at least one processor. Furthermore, in another embodiment, the at least two filtering processes may include at least one process for filtering the plurality of light contexts, and at least one other process for filtering the plurality of heavy contexts and/or the plurality of heavy contexts with the plurality of light contexts. In still yet another embodiment, a filtering loop may be associated with each filtering processes. For example, the filtering loop may include a loop through each of the plurality of contexts, such as the plurality of light contexts, and/or the plurality of heavy contexts with the plurality of light contexts.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
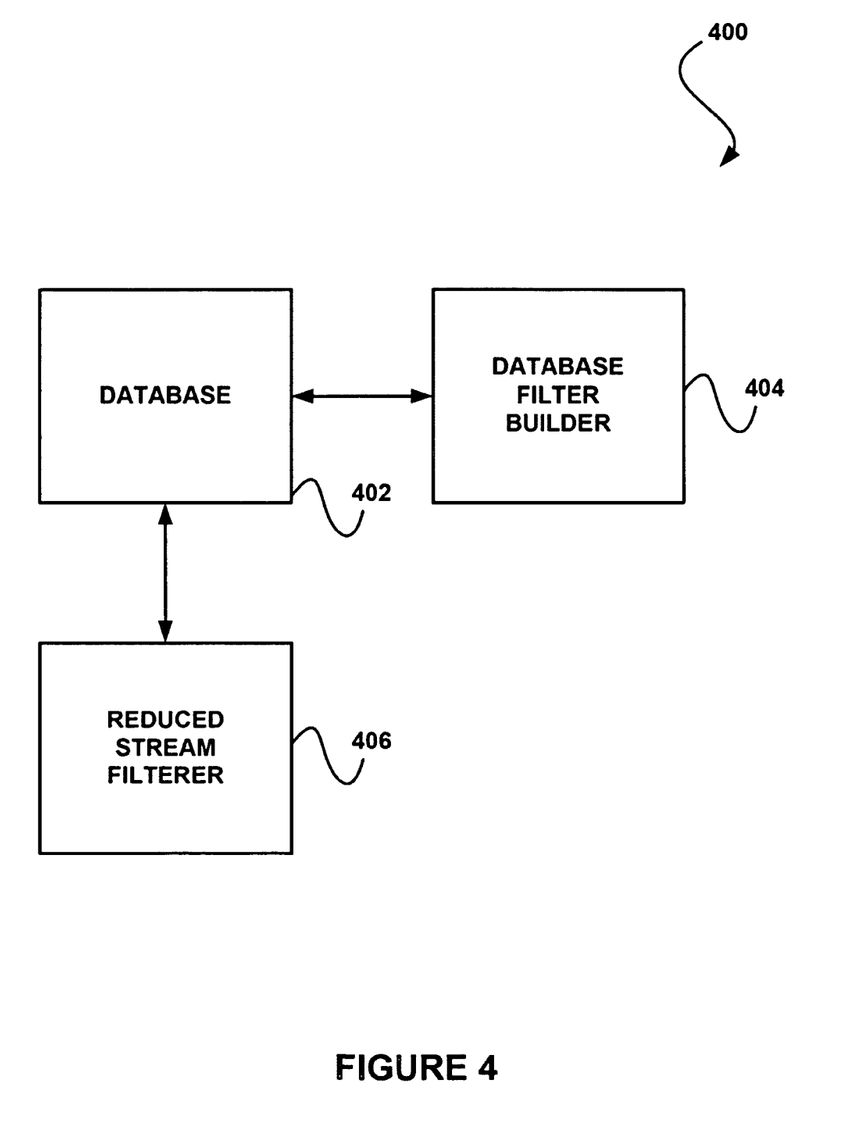
FIG. 4 illustrates a processing system, in accordance with yet another embodiment.

FIG. 4 illustrates a processing system 400, in accordance with yet another embodiment. As an option, the system 400 may be implemented in the context of the details of FIGS. 1-3B. Of course, however, the system 400 may be carried out in any desired environment. Further, the aforementioned definitions may equally apply to the description below.

As shown, the processing system 400 may include a database 402, a database filter builder 404, and a reduced stream filterer 406. In use, the database 402 may receive data streams from a plurality of hosts or applications. For example, the data streams may include any data, records, events, and/or alerts received from the plurality of hosts. Further, the data streams may be received via an application programming interface (API), a network connection, a network socket, or any other method of communicating the data stream from the plurality of hosts to the database. In addition, the plurality of hosts may include clients and servers. Further, these hosts may run specialized software that may collect records, detect fraud, detect intrusions, monitor security, log activity, or any other software capable of generating a data stream.

In addition, the processing system may include a number of different operations. In one embodiment, the processing system may provide data stream filtering. For example, the data stream filtering may include filtering new data streams in order to match at least one rule. In yet another embodiment, the processing system may provide data stream regrouping. In yet another example, the data stream regrouping may regroup data from the data stream matching at least one rule into another context (e.g. time). Still yet, in another embodiment, the processing system may fire an event if there is a critical mass of waiting data. For example, the event may be fired if the mass of waiting data from the data stream exceeds a threshold.

In one embodiment, the data stream filtering is based on contexts within the data stream. Further, the contexts within the data stream may include the number of distinct appearances of a type of data in the data stream. As an example, the contexts may include a flag such as condition or state, and/or attributes such as time, phone number, duration, session record, source host, etc. In addition, the contexts may be further divided into heavy contexts and light contexts. In one embodiment, light contexts may refer to those conditions and/or attributes that have a few distinct appearances in the data stream. Further, in yet another embodiment, heavy contexts may refer to those conditions and/or attributes that have numerous distinct appearances in the data stream. For example, continually incrementing timestamp data in the data stream may be a heavy context since there may be numerous distinct timestamp values in the data stream.

In still yet another embodiment, the processing system may provide filters that may act upon the contexts in the data stream. In one embodiment, the filters may include an original context filter. As an option, the original context filter may provide the original context as received in the data stream. In another embodiment, the filters may include a reduction of context filter. Optionally, the reduction of context filter may attempt to reduce the scope and/or context of the data stream a broader context. For example, the time context in the data stream may be broadened to a context such as hours, days, months, year, date, etc. Furthermore, in the context of the current example, a heavy context such as time may be reduced to a light context such as date. Further, in yet another embodiment, the filters may include a functional transformation filter. As an option, the functional transformation filter may transform the data stream by a function of the processing system. In still yet another embodiment, the filters may include a state filter. Optionally, the state filter may filter the data stream to a matching state. For example, a data stream including phone numbers may be filtered into states such as a domestic caller, or an international caller. Additionally, in one embodiment, the processing system may be dependent upon the distribution and frequency of the contexts in the data stream for processing.

In yet another embodiment, the processing system may utilize a database 402 (e.g. Adjust). Further, the database 402 may utilize any relational database management system (RDBMS) to implement a finite state oriented system. For example, the database 402 may utilize a RDBMS such as MySQL™ by merely mapping the database 402 operations into Standard Query Language (SQL) operations utilized by the RDBMS. Furthermore, by use of the SQL operations, the database 402 may be transparent to the underlying RDBMS. Furthermore, the database 402 may utilize an API for interacting with the aspects and functionality of the database 402.

In another embodiment, the database 402 may reduce the complexity of a data stream thereby simplifying the data definition and manipulation associated with the data received from the data stream. Further, as an option, the database 402 may utilize a cabinet that may be associated with a metadata definition. For example, the cabinet may be utilized in a physical segment of a physical table in the RDBMS and may be further associated with a particular state. In use, a change in state may be indicated by a change in the cabinet. For example, an employee record may reside in an 'active' cabinet while employed, a 'fired' cabinet if let go, or a 'retired' cabinet if retired. In the context of the present example, the three different cabinets may represent the different states that an employee may exist in during the lifecycle of the record. Still yet, in another embodiment, each cabinet may utilize a different set of parameters or fields that are used in that particular state.

Furthermore, in yet another embodiment, the data may not be directly inserted into a cabinet, but may instead be inserted via a discharge operation from a specialized table such as a reactor. Additionally, the cabinet may include a set of reserved fields from a previous cabinet. As an example, the set of fields may be utilized as an enumerated state field that may be represented by a field for the cabinet.

Still yet, in another embodiment, each record in the cabinet may include a header field and a body field. Further, as an option, the body field may include multiple data fields such as slots. In addition, as yet another option, the metadata definition may be utilized for mapping the slots of the body field to the actual conditions and/or attributes utilized by other cabinets. Furthermore, in still yet another option, the header field may include additional control fields. In one embodiment, the additional control fields may be utilized for registration, state management, concurrency, identification, abstraction, and connectivity for the cabinet. In yet another embodiment, the header field may be utilized to control and operate upon the records in the cabinet. Additionally, the number of non-empty contexts for the records in a cabinet may be referred to as a cabinet mass. As an example, the cabinet mass may be increased when at least one empty context is populated for the cabinet. Further, in the context of the present example, the cabinet mass may be decreased when at least one empty context is discharged from the cabinet.

In another embodiment, the header may contain a plurality of fields such as a cabinet, registration identification (RegID), linker, link to (LinkTo), registration time (RegTime), and/or tracker. Optionally, the cabinet field may identify the cabinet. For example, the cabinet field may consist of alpha, numeric, alphanumeric, or binary values that may identify the cabinet. Further, as an option, the RegID field may be utilized for linking records from the same cabinet or a plurality of other cabinets to the cabinet. For example, the linked records may be grouped based on a common condition and/or attribute. In addition, as yet another option, the linker field (e.g. Linkey) may be utilized as a unique key for the cabinet. In one embodiment, the linker field may be concatenated from any of the fields in the header. In yet another embodiment, the linker field may be a match key from any field in the cabinet. Additionally, the LinkTo field may include a pointer from the record to a RegID in the same cabinet or the plurality of other cabinets. Furthermore, as an option, the RegTime field may be utilized as a field for storing the time the record was registered in the cabinet. Optionally, the tracker field (e.g. Trackey) may be utilized to store a numeric header utilized in data stream processing. Further, as yet another option, the numeric header may be hashed.

In yet another embodiment, the database 402 may utilize several types of tables that may be used to stored the data. As an option, the several types of tables may be associated with a metadata definition. In one embodiment, the database 402 may utilize a reactor table as a processing table. Optionally, the reactor table may hold the data that is being processed. As an option, the reactor table may be a temporary table. Further, as yet another option, the data in a reactor table may be dropped or inserted into another table. In addition, in another embodiment, the data from the data stream may enter the processing system 400 through a reactor table of the database 402 such that data from the data stream may insert or update data into the reactor table for processing. In one embodiment, the reactor table may discharge the data into a data table. As another option, once all the data is discharged from the reactor table, the reactor table may be utilized to process a new data stream.

Still yet, in another embodiment, there may be several types of reactor tables (e.g. a driving reactor) that may reference a data stream and may further join with other tables via the linker field. In addition, as an option, a satellite reactor may extend the driving reactor such that each record may be a member in a cabinet with identical RegID numbers. Further, as yet another option, a resulting reactor may serve as a connecting table for the data in the driving reactor and any rules fired from a rules table (e.g. DOQMA table). Additionally, in another embodiment, the resulting reactor may be joined with the same context in a reactor table. Optionally, if the linker field is not unique for the cabinet, then one or more rules may be fired if the result is positive.

In one embodiment, the database 402 may utilize a data table for storing data discharged from the reactor table. Further, the data table may include the linker field that may identify the cabinet for the data. In addition, in yet another embodiment, the database 402 may utilize an archive table for storing historical data. Further, as an option, the archive table may be utilized to store the data associated with a unit of time. For example, the database 402 may have an archive table for each month of the year, such as 'archive_1' to 'archive_12,' in order to store historical data based on the month.

As another option, the archive data may be stored in one table with the use of database partitioning. As another example, the archive table for each month of the year may be renamed in order to shift the archives back a month, thereby removing the oldest archive table and creating a new archive table. Optionally, there may be any number of archive tables and not simply the 12 iterations as disclosed in the previous examples.

Furthermore, the database 402 may utilize an accumulator table that may include contexts and other aggregated values. In one embodiment, the contexts of the accumulator table may be locked such that only the aggregated values may be updated. As an option, the aggregator table may collect values on the contexts. Optionally, the aggregator table may allow for joins with other tables via the linker field. Still yet, in another option, the database 402 may utilize a linker table that may link a plurality of header fields to fields in other tables.

Moreover, the database 402 may utilize a rules table where the linker field may hold a permutation of contexts associated with at least one rule. For example, each permutation of the contexts may be identified by a different cabinet identifier. In addition, in one embodiment, an additional field in the rules table may identify a rule that may be fired when a similar context is met for data from the data stream. Further, in yet another embodiment, the rules table may include a unique linker field for each cabinet that may set the context of a reactor's fields associated with the data stream (e.g. a driving reactor). Furthermore, as an option, the processing system 400 may be orthogonal to the number of rules. For example, if a new rule includes a plurality of contexts associated with at least one existing filter, then adding a new rule to the rules table may not increase the number of contexts filtered.

In one embodiment, the tables may be joined via the linker field in several different ways. For example, the tables may be joined as a reactor table to another reactor table, a reactor table to a data table, an accumulator table to an archive table, an accumulator table to another accumulator table, etc. As an option, the tables may interact with each other by matching the linker field in a join (e.g. collision). In one example, if the reactor's cabinet is the same as the existing cabinet, then the contexts of the cabinet may be populated or manipulated with the reference table contexts. In another example, if the reactor's cabinet is different from the existing cabinet, which may indicate a state change, then the fields in the reactor that are not active in the prior cabinet may be updated or manipulated utilizing the reference table fields.

In another embodiment, the database 402 may utilize several state operators for operating on the records in the tables. For example, the database 402 may utilize an arm operator that may occur when the linker field in the header receives a new value for the processing cycle. As an option, for each filtering iteration, the linker field may be prepared or updated via an absolute arm operation or a relative arm operation. Further, in yet another option, the absolute arm operation may set the linker field in the header. Optionally, the relative arm operation may update the value in the linker field in the header. For example, the updating may include adding an additional context to the linker field.

Additionally, in one embodiment, the database 402 may utilize a disarm operator that may set the cabinet field in the header to zero. As an option, the disarm operator may represent a logical delete of the record from the table. For example, cabinet zero may have a mass of zero. In addition, as yet another option, the database 402 may process only those records with a non-zero value in the cabinet field. Furthermore, in another embodiment, the database 402 may utilize a collision operator. As an option, the collision operator may be similar to a join operator. Further, as another option, the collision may occur between two cabinets via a header field such as a linker. Moreover, as yet another option, the database 402 may utilize a state operator that may change the cabinet number to a non-zero value. For example, a change in state may be represented by a change in the cabinet.

In addition, in yet another embodiment, the database 402 may utilize a charge operator that may occur when the cabinet mass is increased. Further, as an example, the database 402 may utilize a discharge operator if content in a reactor table is moved to a non-reactor table within the same cabinet, thereby decreasing the mass of the reactor table. For example, the discharge operation may occur when filtered data in a reactor table is moved to a more persistent table. Moreover, in another embodiment, the database 402 may utilize a de-escalate operation. As an option, the de-escalate operation may occur when contexts are copied to another reactor that thereby reduces the mass of the original reactor. For example, the de-escalated reactor may have a role in data stream filtering in combination with a light context filtering process. Additionally, in one embodiment, the database 402 may utilize a rolling operator to move data from one row to the following row. For example, the rolling operator may move data from the Nth row to the Nth+1 row. Furthermore, in still yet another embodiment, the database 402 may utilize a skip operator. Optionally, the skip operator may update a field in the header to disable joins or collisions.

Figure 5:
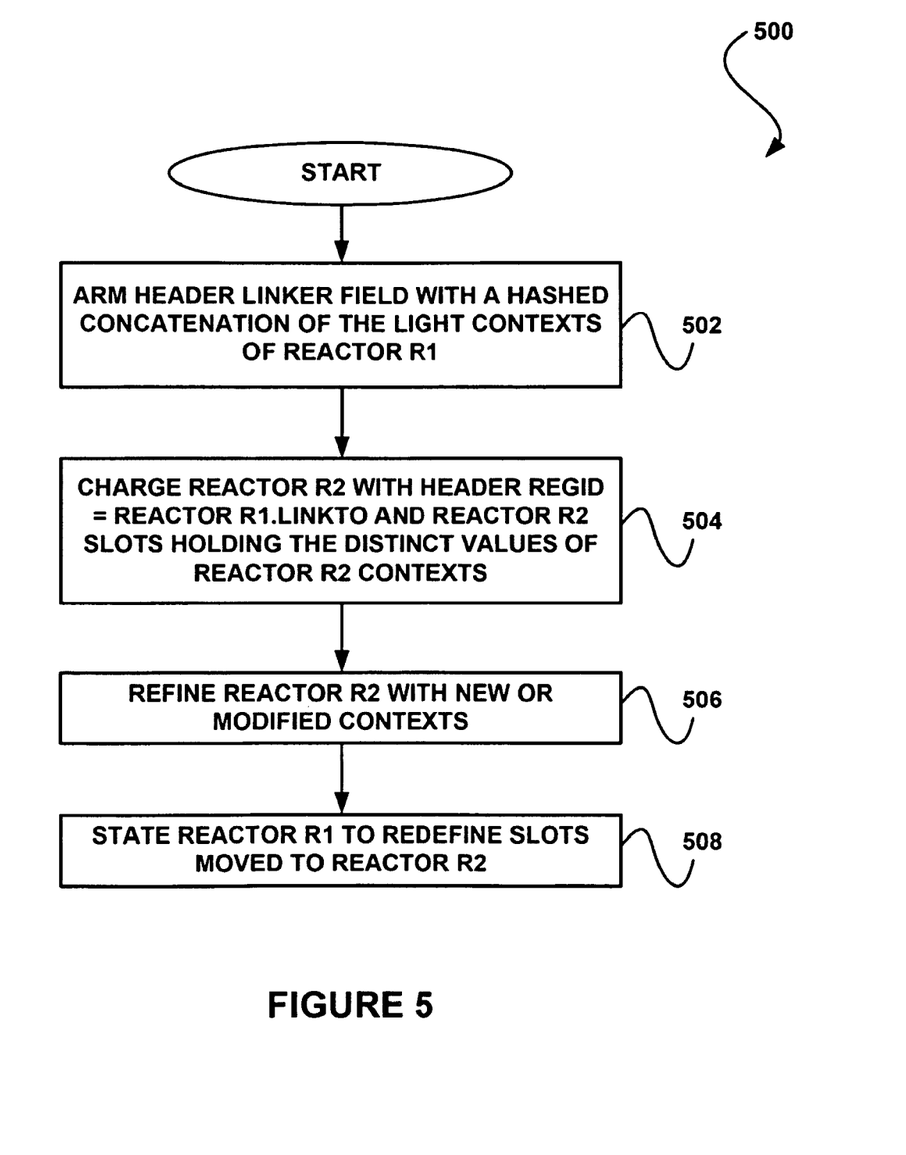
FIG. 5 illustrates a method for a de-escalating a reactor, in accordance with still yet another embodiment.

FIG. 5 illustrates a method 500 for a de-escalating a reactor, in accordance with still yet another embodiment. As an option, the method 500 may be implemented in the context of the details of FIGS. 1-4. Of course, however, the method 500 may be carried out in any desired environment. Further, the aforementioned definitions may equally apply to the description below.

In one embodiment, a reactor is de-escalated by performing an arm operation on a header LinkTo field such that the LinkTo field may contain a hashed concatenation of light contexts of reactor R1. See operation 502. Further, a charge operation is performed on reactor R2 in order to charge the header RegID field with the value of the reactor R1 LinkTo field and the reactor R2 slots holding the distinct values of the contexts in reactor R2. See operation 504. In addition, the reactor R2 is refined with new or modified contexts, as seen in operation 506. As an option, the slots of reactor R1 may exist with the reactor R2 RegID field pointing to the reactor R1 LinkTo field. Additionally, a state operation is performed on the reactor R1 to redefine the slots moved to reactor R2. See operation 506. Furthermore, as another option, the state operation on reactor R1 may free the unused slots in order for the slots to hold new contexts for future operations.

Figure 6:
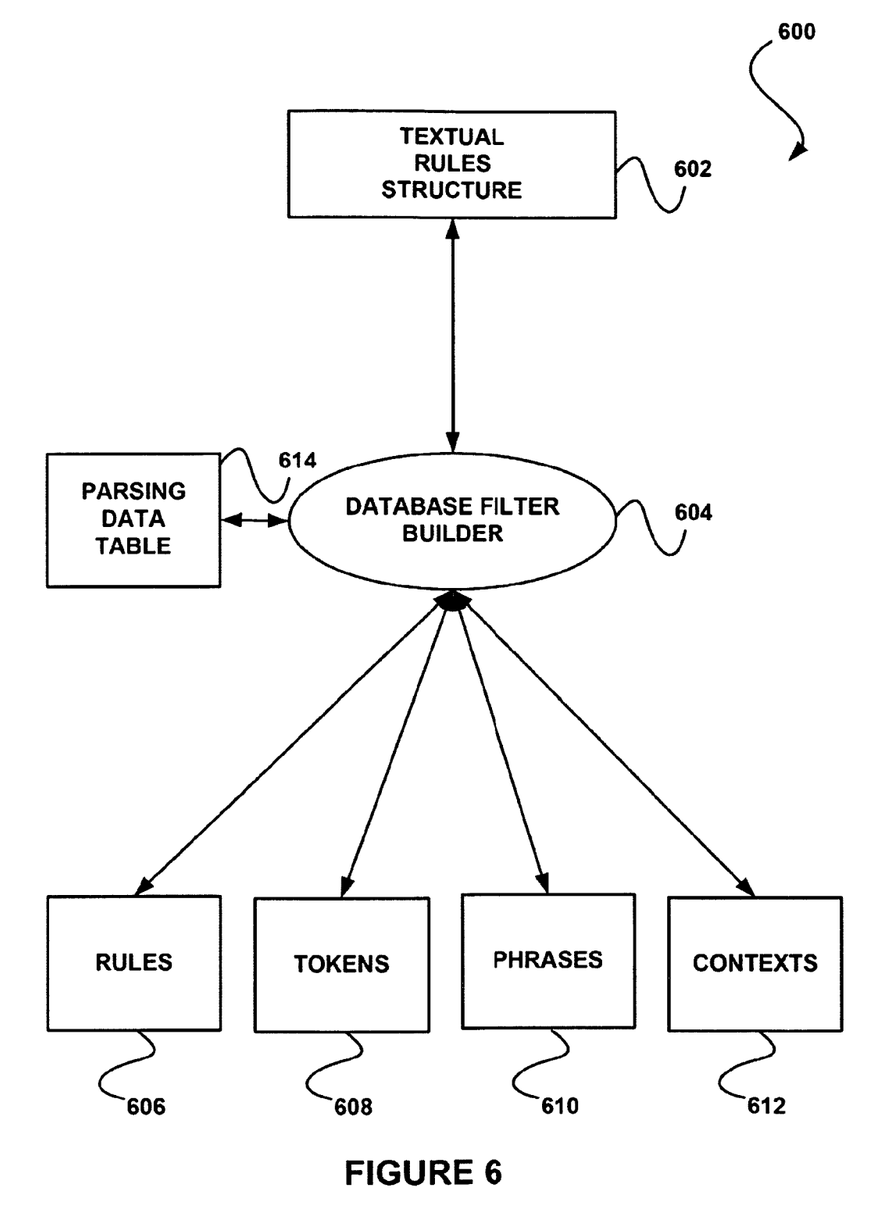
FIG. 6 illustrates a system for a database filter builder, in accordance with one embodiment.

FIG. 6 illustrates a system 600 for a database filter builder, in accordance with one embodiment. As an option, the system 600 may be implemented in the context of the details of FIGS. 1-5. Of course, however, the system 600 may be carried out in any desired environment. Further, the aforementioned definitions may equally apply to the description below.

As shown, the system 600 may include a textual rules structure 602, and a database filter builder 604 for decomposing the textual rules structure 602 into tokens. For example, the textual rules structure 602 may include a rules file, a text file, another database, a data feed, or any other data structure capable of storing a rules structure. Further, the textual rules structure 602 may be application specific. In addition, the textual rules structure 602 may be analyzed using the database filter builder 604. As an option, the database filter builder 604 may utilize an interpreting module in order to read the textual rules structure 602. Furthermore, the database filter builder 604 may translate the textual rules structure 602 into a format used by a processing system.

In one embodiment, the database filter builder 604 may decompose the textual rules structure 602 tokens in order to build rules tables for use by the processing system. Optionally, the textual rules structure 602 may include a plurality of rules. As an option, the database filter builder 604 may tokenize each rule into tokens and may place the tokens into a parsing data table 614 (e.g. CP_Parser). Further, the database filter builder 604 may determine the number of contexts. For example, a rule of "ACTION IN 'ACT1+ACT2' and REASON IN 'RES1+RES2+RES3'" may have the contexts of ACTION and REASON. Furthermore, in one option, the contexts from the rule may be utilized to construct a metadata cabinet and a contexts cabinet that may be added to the metadata cabinet.

Further, in another embodiment, each rule may initially be fired by one or more phrases nested within an AND/OR logic hierarchy within the rule. For example, the rule may consist of one or more phrases that may each filter some contexts against a set of values. Additionally, in yet another embodiment, these rules may be filtered by the rules including light contexts and the rules including heavy contexts with or without light contexts. Still yet, as an option, the specific values of the contexts in the rule that participate in different phrases of the rule may be filtered. Optionally, each context within the rule may pass the filter at least one value. As an option, when multiple values exist for a context, a serialization may occur for each single value in each context. Further, in still yet another embodiment, the serialization may arm a header field of the cabinet with the single value. As an option, the serialization may arm the linker field in the header. For example, the rule "ACTION IN 'ACT1+ACT2' and REASON IN 'RES1+RES2+RES3'" may be serialized as a combination of: "ACT1#RES1,". "ACT1#RES2," "ACT1#RES3," "ACT2#RES1," "ACT2#RES2," and "ACT2#RES3." Furthermore, as an option, each combination may be hashed, which may provide better performance. In one embodiment, each combination is hashed using a CRC32 hash. For example, a CRC32 hash of the combination "ACT1#RES1" (9 bytes) may result in the integer value of 2378585481 (4 bytes).

In yet another embodiment, the parsing data table 614 may be organized in a tree structure with pointers to the parent node from the leaf nodes. In use, the tree structure may allow for improved navigation throughout the parsing data table 614. Still yet, in another embodiment, the database filter builder 604 may read the plurality of rules from textual rules structure 602. Further, in one option, the database filter builder 604 may build a tree structure to hold the phrases. As an option, the database filter builder 604 may distinguish between phrases based on the use of the logical OR operator. Additionally, as another option, the database filter builder 604 may, for every logical AND operator with a single logical OR operator as a leaf node, reorder the tree to place the logical OR operator above two logical AND operators. For example, phrase of "Z AND (X OR Y)" may be reordered as the logically equivalent phrase of "(X AND Z) OR (Y AND Z)." In another embodiment, the database filter builder 604 may add the phrases to an array. Optionally, the tree structure may be parsed in order to build the phrases for the phrase chunks that may be based on the logical OR operator or a logical EQUAL operator.

Furthermore, in yet another embodiment, the database filter builder 604 may move any logical NOT operator to the end of the phrase. Additionally, as an option, the database filter builder 604 may locate any duplicated contexts in the phrases. For example, the database filter builder 604 may iterate through the regular part of the phrase and find any contexts that appear more than once. Further, as another option, the contexts that match may be united. Optionally, the contexts that do not match may be discarded. Additionally, in one embodiment, the database filter builder 604 may iterate through the NOT part of the phrase and find any contexts that appear more than once. Further, as an option, the contexts that match may be united. Optionally, the contexts that do not match may be discarded. Still yet, as another option, the resulting phrases in the regular part of the phrase may be checked against the NOT part of the phrase such that matching phrases may be discarded. As an option, the regular part of the phrase may be double checked for duplicate contexts.

In addition, in another embodiment, the database filter builder 604 may store the phrases into a table. As an option, the database filter builder 604 may store the type of the phrase, and the phrases for the rule up to the NOT phrases into values of the row of the table. Further, as another option, the database filter builder 604 may add the row to the table and may additionally save the phrase RegID. Optionally, if at least one NOT phrase exists, the database filter builder 604 may add the NOT phrases to the table utilizing the phrase RegID. Furthermore, as still yet another option, once all the phrases are in the table, the array may be cleared.

In yet another embodiment, the context cabinets may hold filtering values in several tables referred to as reference data filtering tables. For example, the reference data filtering tables may include a rules table 606, a tokens table 608, a phrases table 610, and a plurality of context cabinets 612. Further, as an option, the reference data filtering tables may be connected via the RegID field and LinkTo field in the table header. In one embodiment, the reference data filtering tables may include a field associated with a plurality of contexts. Additionally, in still yet another embodiment, the records in the reference data filtering tables may point to light context tables or heavy context tables. Optionally, the reference data filtering tables may be populated based on the records in the parsing data table 614 populated by the database filter builder 604 parsing the textual rules structure 602. Still yet, in another embodiment, the database filter builder 604 populating the reference data filtering tables may not be dependent upon the textual rules structure 602. As an option, the reference data filtering tables may be populated using separate queries, utilities, or other data sources capable of loading rules in the reference data filtering tables.

In addition, in one embodiment, the reference data filtering tables may be separated into Looping Context Cabinet Values (LP), and Looping Not Context Cabinet Values (LN). Further, as an option, the LN cabinet tables may be symmetric to regular context cabinets with the exception that the LN cabinet tables may have a pointer in the LinkTo field referencing the RegID of a regular context cabinet. For example, if a data record join with a regular context table is positive and if a NOT pointer exists, then the data record linker field may be prepared to join with a LN cabinet table. Further, in the context of the present example, if the join is successful, then the rule may be rejected, and if the join was not successful, then the rule may be accepted. Table 1 illustrates such reference data filtering tables in accordance with one example.

TABLE 1

| RegID | YesCabinet | YesLinker | NotCabinet | Rule |
|---|---|---|---|---|
| 2811 | 1000 | 3c6#0fb | 1002 | 1 |
| 2812 | 1001 | 1cd | 1003 | 1 |

In another embodiment, the database filter builder 604 may create the rules table 606 (e.g. CP_Dims), the tokens table 608 (e.g. CP_Rules), the phrases table 610 (e.g. CP_Phrases), and the plurality of context cabinets 612. Further, as an option, each of the plurality of context cabinets 612 may be created to represent the different combination of contexts as seen in the rules phrases. In addition, as yet another option, each of the plurality of context cabinets 612 may be further classified upon the usage in the filtering process. For example, one context cabinet of the plurality of context cabinets 612 may contain two concatenated contexts such as "MessageInfo+Product," while another context cabinet of the plurality of context cabinets 612 may contain a single context such as "Action." Table 2 illustrates such cabinets in the plurality of context cabinets 612 in accordance with the present example.

TABLE 2

| Cabinet | Context | Type | Collision String |
|---|---|---|---|
| 1000 | MessageInfo+Product | LP | C11, C5 |
| 1001 | Action | LN | C10 |

In addition, Table 3 illustrates the reference rules table 606 in accordance with one example.

TABLE 3

| Cabinet | RegID | Linker | LinkTo | RegTime |
|---|---|---|---|---|
| 1000 | 2567 | 3c6#0fb | 137 | 2007-11-01 12:00:01 |
| 1001 | 2311 | 1cd | 138 | 2007-11-01 12:00:01 |

Further, as yet another option, the context field may be utilized to contain the partial match that may trigger an arm operation for the linker field in the header before the cabinet table is joined with the reference rules table.

Figure 7:
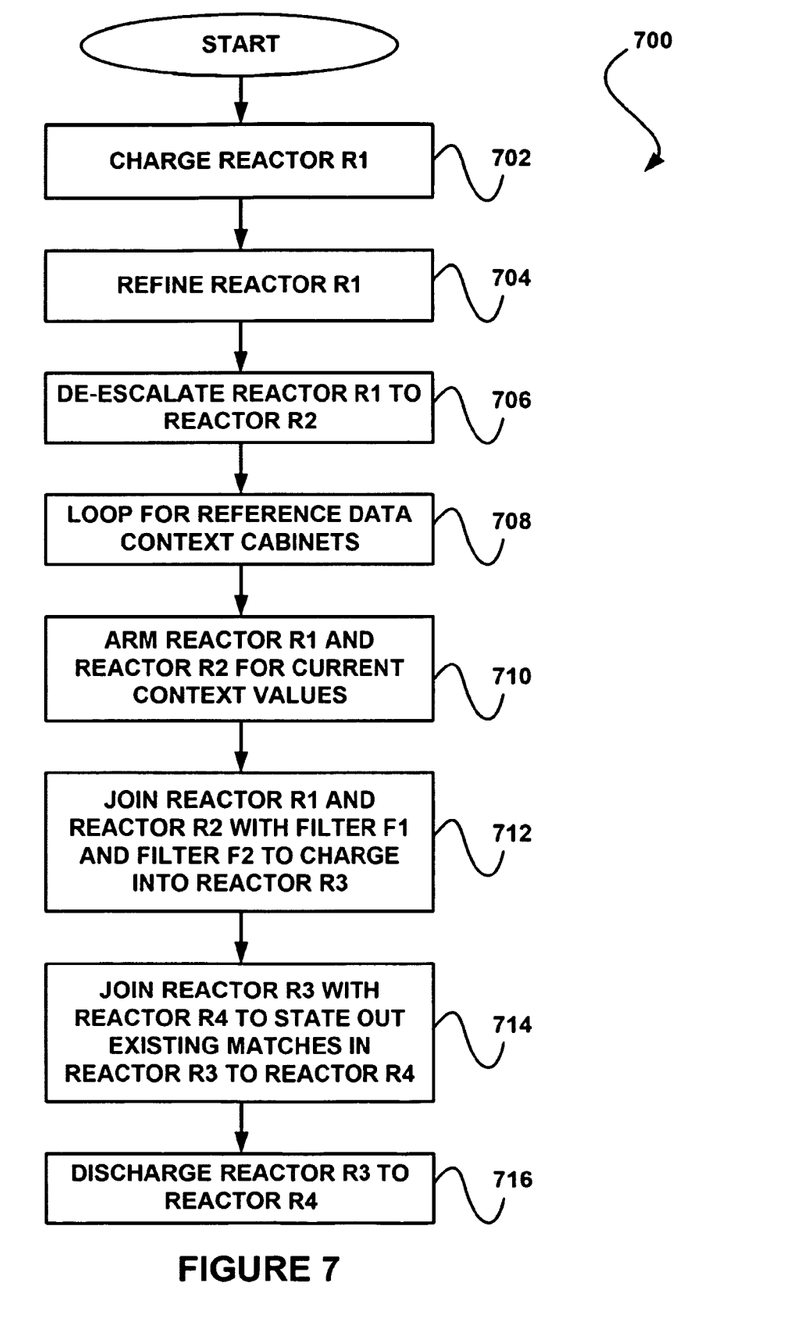
FIG. 7 illustrates a method for a reduced stream filter, in accordance with another embodiment.

FIG. 7 illustrates a method 700 for a reduced stream filter, in accordance with another embodiment. As an option, the method 700 may be implemented in the context of the details of FIGS. 1-6. Of course, however, the method 700 may be carried out in any desired environment. Further, the aforementioned definitions may equally apply to the description below.

As shown in operation 702, a reactor R1 is charged. As an option, the received data stream may be charged into reactor R1. Further, as yet another option, if the reactor R1 does not exist, then the charge operation may be implemented with an SQL insert operation that maps the data stream upon the data slots in the reactor R1. For example, the context "MessageInfo" from the data stream may be mapped into a slot such as C13. In addition, in one embodiment, after creating new data records associated with the data stream into reactor R1, an arm operation may be performed associated with the header. Optionally, in the case of non vanishing tables (NVTs), the SQL update operation may be used to set the slots to contexts of the data stream. In addition, as another option, the concatenations of the contexts of reactor R1 may be hashed into the LinkTo field of the header. Furthermore, as still yet another option, the NVTs may be similar to fixed memory blocks such that the NVT may be loaded via an SQL update statement on the RegID. Still yet, as another option, for the NVT, a disarm operation may be utilized in order to set the existing cabinet values in the header to zero.

Further, as shown in operation 704, the reactor R1 is refined. In one embodiment, some of the slots may be set with context values that may include a functional or logical transformation of the existing data. For example, the data may be hashed, the data may be reduced using time functions (e.g. DAYOFWEEK, MONTH, YEAR, etc.), or state indicators may be set (e.g. business time on or off, etc.). In addition, as an option, the contexts may be acquired outside of the reactor R1 by a join operation on the reference rules table data. Further, as yet another option, the join may translate some values of the reference rules table data. Still yet, in one option, the join operation may be preceded by an arm operation for a header.

In addition, as shown in operation 706, the reactor R1 is de-escalated into reactor R2. Further, in another embodiment, the mass of reactor R2 may be charged during the de-escalation process. For example, depending on the distribution of light contexts, the cabinet mass for reactor R2 may be reduced to a fraction of the reactor R1 cabinet mass. Additionally, as an option, the reactor R2 may be further refined before the filtering starts.

Further, in one embodiment, a skip operation may be used on the reference data tables to prevent joins. Additionally, in another embodiment, the reactor R1 may be stated to a new cabinet. As an option, the new cabinet may hide all the contexts moved to reactor R2 such that the moved contexts may not be overwritten by new values. Furthermore, as another option, the newly freed slots defined in metadata may be used for the new contexts developed in reactor R1. As an option, new analytical calculations may be performed such as determining a new cabinet mass, a decrease in cabinet mass, a de-escalation ratio, and/or a de-escalation mass loss.

In one example, de-escalation may save a telecommunications rating system utilized for charging subscribers according to their activities, as recorded in call data records, enormous amounts of work based on performing the rating on the call data records. In the context of the present example, if a unit of charge is one minute, then there may be a lesser number of distinct values vs. a unit of charge measured in seconds. Furthering this example, if the longest duration in 10,000 call data records is 25 minutes, then the de-escalated reactor may only contain 25 distinct values of duration. Further, in yet another example, if the start time values are passed through a function that transforms the values into a small context of PEAK and OFF_PEAK, then the number of contexts in the de-escalated reactor might be two, which may keep mass small.

Optionally, a skip operator may be performed as an optional preliminary filtering of some part of the reference data based on the state variables in reactor R1 and reactor R2. Further, as another option, the skip operator may be implemented with a SQIP operation. As an option, the SQIP operation may deny service by negating a value of the linker field or any other connectivity field in the header. For example, implementing the skip operator in the header and not at the slot level may allow for the record to be restored by restoring the header to the normal value. As another example, if the values in the reactor R2 for the context "Action" are set to "Off", many of the rules applying for the state of "Action" set to "On" in the corresponding reference data may be eliminated with a disarm operator. In the context of the current example, disarming the corresponding reference data may reduce the mass of the reference data table and may increase the speed of filtering. In addition, in one embodiment, after a skip operator completes, the reference data cabinet may be armed via an arm operation before a new data stream is processed.

As shown in operation 708, the reference data context cabinets are looped. In one embodiment, in the filtering loop, a parallel process serving some context for a reference data table is activated. For example, the parallel process may include filter F1 for the light contexts, and filter F2 for the heavy contexts. In addition, filtering may be more efficient and faster with a small number of context cabinets involved. Furthermore, the filtering loop may have a not filtering loop embedded for any context cabinet set to a not condition. Still yet, in another embodiment, filtering conditions may include positive filtering conditions such as those conditions that may be included in the fields. Further, as an option, for any positive filtering conditions that may be expressed as permutations of contexts, there may be one or more negative filtering conditions. Table 4 illustrates such positive filtering conditions with one or more negative filtering conditions in accordance with the present example.

TABLE 4

```
Product = 'VPN'
AND Protocol = 'TCP'
AND NOT (
    (Port = 80)
    OR (Port = 78 AND Network = 'LOCAL')
)
```

Further, in the above example in Table 4, there may be a positive context permutation (Product and Protocol) and two negative permutations ((Port) and (Port and Network)). In addition, in the context of the present example, if data passes the positive filter and the negative filter (e.g. the Not loop), then the data may fail the consolidated filter for one or more rules. Furthermore, in another embodiment, the linker field in the header may be utilized since the use of the Not operator may be implicit in the linker field, which may serve as a match key for some reference data table.

As shown in operation 710, the reactor R1 and the reactor R2 are armed for the current context values. In one embodiment, the arm operation may be performed for the header linker field in the reactor for each cabinet. Further, there may be two types of arm operations, an absolute arm and a relative arm. In another embodiment, the absolute arm operation may set the linker field in the header. In yet another embodiment, the relative arm operation may update the incremental context value in the linker field in the header. In addition, as an option, the reference data may hold the appropriate matching data for the cabinet in the linker field of the header with the number of rules fired on each match. Still yet, in another embodiment, some values of the linker field in the reference table may fire one or more rules. As an option, a rule may be fired by different context cabinets. For example, a rule may have two conditions utilizing an OR operator where the first condition has two contexts and the second condition has three contexts. In the current example, the rule may activate two loops where the first loop may set the linker field to join on two contexts, and the second loop may set the linker field to join on three contexts. Optionally, a mechanism such as a RegID to Rule mechanism may prevent duplicates from occurring.

As shown in operation 712, the reactor R1 and reactor R2 are joined with filter F1 and filter F2 in order to charge the matching records in a reactor R3. In one embodiment, a join between reactor R1 and/or reactor R2 with reference data tables for filter F1 and/or filter F2 may be used to charge reactor R3. In addition, as an option, the header for reactor R3 may encapsulate the reactor R1 and/or reactor R2 RegID with the rule being applied from filter F1 and/or filter F2. Optionally, the encapsulation may be accomplished by hashing the combined value into the reactor R3 header LinkTo field. As another option, the encapsulation may be accomplished as a concatenation into the linker field.

Additionally, as shown in operation 714, the reactor R3 is joined with reactor R4 to state out the existing matches in reactor R3 into reactor R4. In one embodiment, the reactor R3 may be a temporary reactor. Further, as an option, an entry into reactor R3 may be representative of some original record RegID with a rule using some context cabinet. In addition, as yet another option, in order to make the result permanent, the RegID and rule must be validated as not being fired by another context cabinet. For example, if the reactor R10 is a final filtering reactor, then reactor R3 may be stated to a trashing cabinet if the reactor R3 and reactor R4 collide positively on some linker field. Furthermore, in yet another embodiment, the mechanism for preventing duplicates for any RegID and rule may proceed step by step upon each firing for some context combination that may be represented by concatenated fields in the linker field of the header. Further, as an option, any matching records in a matching reactor may be validated against an accumulated reactor of matched records. For example, if there is a match on RegID and the rule exists, then the new records may not be added to the accumulated reactor. Optionally, by stating the reactor R3 to a trashing cabinet, the cabinet value may be set to some value (e.g. −1) where the records may not transfer to the accumulated reactor, and may instead be truncated before the next step.

As shown in operation 716, the reactor R3 is discharged into reactor R4. In one embodiment, when all the loops have terminated, the reactor R4 may have all the links required for the filtered records with the appropriate fired rules.

In still yet another embodiment, some rules may interact with heavy contexts such as in a multiple-tier scenario. For example, a heavy context may be a rule filtering for activity on a specific source telephone number to destination telephone number combination. Still yet, in the context of the current example, the rule may also filter light contexts. In the present example, the process may iterate on the heavy context cabinets, and for each heavy iteration, an internal loop may be performed on the light context cabinets. In yet another example, the rules fired may be specified on the lowest level of the tier hierarchy. Further, in such example, the first tier may be targeting the reactor R1 that may be holding the heavy context values and the light context values may be examined as a subset of reactor R2 having a link to the filtered portion of reactor R1. In another embodiment, the efficient multi-tiered configuration may create a small number of records on the first levels of the tiers and may expand on the lower levels until the values are finally written to a reactor such as reactor R4.

Still yet, in another embodiment, the tier levels may be optimized. For example, there may be a decision to break the hierarchy for the light contexts or the heavy contexts. In one embodiment, the method of organizing the filtering the first tier and the next tier is empirical and may not require a break of the context cabinet. In addition, since the filtering uses two fields in the header, there may be a speed benefit for smaller linkers on a join. As an option, the two fields in the header may be cabinet, which may reflect state, and the linker, which may include the concatenation of context values. Further, as yet another option, instead of using a long permutation of contexts for the linker field, the linker may be split into two or more permutations in order to create tiered filtering. For example, if there are 40,000 records with 10 dependent permutations, and only 8 of them are positive for a rare context "Action," then the time spent on the internal loops for the 8 records may be negligible. Furthermore, as an option, when the context permutations exceed a maximum length for the linker field, then the contexts may be split via a constrained split into tiered filtering. In addition, as yet another option, the optimal optimization for the tier levels may be achieved when the total cabinet mass participating in the filtering for all the tiers is minimal.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A method, comprising:
analyzing a plurality of rules in a textual rules structure;
decomposing the plurality of rules into a plurality of contexts, based on the analysis;
storing the plurality of contexts into a table;
generating a plurality of concatenated values, each concatenated value comprising one value associated with a context of one of the plurality of contexts joined with one value associated with at least one other context of the one of the plurality of contexts; and
storing the plurality of concatenated values in a plurality of filtering tables; wherein the plurality of filtering tables include a light context filtering table storing at least one concatenated value representing a combination of light contexts, a heavy context filtering table storing at last one concatenated value representing a combination of heavy contexts, a heavy and light context filtering table storing at last one concatenated value representing a combination of at least one heavy context and at least one light context, a looping filtering table storing at least one positive context that is utilized for positively filtering values, and not looping filtering table storing at least one negative context that is utilized for negatively filtering values;
wherein each of the plurality of contexts is identified as a heavy context or a light context based on a predetermined number of distinct occurrences of data in a data stream;
wherein the light context is predetermined to have a fewer number of distinct occurrences in the data than a number of distinct occurrences included in the heavy context;
wherein if each context in the plurality of contexts filters a plurality of values, then the plurality of values is serialized into a series of concatenated values.

2. The method of claim 1, wherein the textual rules structure includes a rules file.

3. The method of claim 1, wherein each context in the plurality of contexts include at least one value capable of being utilized for filtering.

4. The method of claim 1, wherein each context may include one of a source address, a source port, a source type, a destination address, a destination port, a destination type, a protocol, a service, a reason, a product, message information, an originating number, a destination number, a time, a date, a timestamp, a duration, a flag, a condition, a session record, and an attack.

5. The method of claim 1, further comprising determining if the plurality of contexts includes at least one duplicate context.

6. The method of claim 1, further comprising identifying a corresponding table identifier associated with one of the plurality of contexts.

7. The method of claim a 1, wherein the plurality of concatenated values are hashed.

8. The method of claim 1, wherein the plurality of filtering tables include a corresponding table identifier associated with the one of the plurality of contexts.

9. The method of claim 1, further comprising storing each of the plurality of rules in a rules table.

10. The method of claim 1, wherein the analyzing of the plurality of rules includes reading the textual rules structure, determining a format of the textual rules structure, and examining the textual rules structure, and the analyzing of the textual rules structure determines how to decompose the plurality of rules into the plurality of contexts.

11. The method of claim 2, wherein the rules file is application specific.

12. The method of claim 5, further comprising removing the at least one duplicate context from the plurality of contexts prior to the storing of the plurality of contexts, if it is determined that the plurality of contexts includes the at least one duplicate context.

13. The method of claim 6, wherein the corresponding table identifier is stored in the table with the one of the plurality of contexts.

14. The method of claim 9, wherein each of the plurality of rules is associated with at least one of the plurality of contexts stored in the table.

15. The method of claim 11, wherein the application specific rules file is analyzed by an interpreting module.

16. A computer program product embodied on a tangible computer readable medium, comprising:
computer code for analyzing a plurality of rules in a textual rules structure;
computer code for decomposing the plurality of rules into a plurality of contexts, based on the analysis;
computer code for storing the plurality of contexts in a table;
computer code for generating a plurality of concatenated values, each concatenated value comprising one value associated with a context of one of the plurality of contexts joined with one value associated with at least one other context of the one of the plurality of contexts; and
computer code for storing the plurality of concatenated values in a plurality of filtering tables;
wherein the plurality of filtering tables include a light context filtering table storing at least one concatenated value representing a combination of light contexts, a heavy context filtering table storing at last one concatenated value representing a combination of heavy contexts, a heavy and light context filtering table storing at last one concatenated value representing a combination of at least one heavy context and at least one light context, a looping filtering table storing at least one positive context that is utilized for positively filtering values, and not looping filtering table storing at least one negative context that is utilized for negatively filtering values;
wherein the computer program product is operable such that each of the plurality of contexts is identified as a heavy context or a light context based on a predetermined number of distinct occurrences of data in a data stream; wherein the computer program product is operable such that the light context is predetermined to have a fewer number of distinct occurrences in the data than a number of distinct occurrences included in the heavy context;

wherein the computer program product is operable such that if each context in the plurality of contexts filters a plurality of values, then the plurality of values is serialized into a series of concatenated values.

17. A system, comprising:

a processor for analyzing a plurality of rules in a textual rules structure, decomposing the plurality of rules into a plurality of contexts, based on the analysis, and generating a plurality of concatenated values, each concatenated value comprising one value associated with a context of one of the plurality of contexts joined with one value associated with at least one other context of the one of the plurality of contexts; and memory for storing the plurality of contexts in a table, and storing the plurality of concatenated values in a plurality of filtering tables;

wherein the plurality of filtering tables include a light context filtering table storing at least one concatenated value representing a combination of light contexts, a heavy context filtering table storing at last one concatenated value representing a combination of heavy contexts, a heavy and light context filtering table storing at last one concatenated value representing a combination of at least one heavy context and at least one light context, a looping filtering table storing at least one positive context that is utilized for positively filtering values, and not looping filtering table storing at least one negative context that is utilized for negatively filtering values;

wherein the system is operable such that each of the plurality of contexts is identified as a heavy context or a light context based on a predetermined number of distinct occurrences of data in a data stream;

wherein the system is operable such that the light context is predetermined to have a fewer number of distinct occurrences in the data than a number of distinct occurrences included in the heavy context;

wherein the system is operable such that if each context in the plurality of contexts filters a plurality of values, then the plurality of values is serialized into a series of concatenated values.

18. The system of claim 17, wherein the processor is coupled to the memory via a bus.

\* \* \* \* \*

UNITED STATES PATENT AND TRADEMARK OFFICE
CERTIFICATE OF CORRECTION

PATENT NO. : 7,962,490 B1  Page 1 of 1
APPLICATION NO. : 11/970438
DATED : June 14, 2011
INVENTOR(S) : Kariv It is certified that error appears in the above-identified patent and that said Letters Patent is hereby corrected as shown below:

In the claims:
    Claim 1, col. 17, line 36; please replace "last" with --least--;
    Claim 1, col. 17, line 39; please replace "last" with --least--;
    Claim 16, col. 18, line 53; please replace "last" with --least--;
    Claim 16, col. 18, line 55; please replace "last" with --least--;
    Claim 17, col. 19, line 24; please replace "last" with --least--;
    Claim 17, col. 20, line 2; please replace "last" with --least--.

Signed and Sealed this
Eleventh Day of March, 2014

Michelle K. Lee
*Deputy Director of the United States Patent and Trademark Office*